(12) United States Patent
Colson et al.

(10) Patent No.: US 7,647,382 B2
(45) Date of Patent: *Jan. 12, 2010

(54) INSTANT MESSAGING WITH CALLER IDENTIFICATION

(75) Inventors: Vicki L. Colson, Tavernier, FL (US); Victor S. Moore, Lake City, FL (US); Glen R. Walters, Hollywood, FL (US); Thomas Creamer, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/062,325

(22) Filed: Apr. 3, 2008

(65) Prior Publication Data

US 2008/0222260 A1   Sep. 11, 2008

Related U.S. Application Data

(63) Continuation of application No. 10/237,650, filed on Sep. 9, 2002, now Pat. No. 7,376,703.

(51) Int. Cl.
*G06F 15/16* (2006.01)
*H04M 1/64* (2006.01)

(52) U.S. Cl. .................................... 709/206; 379/88.21
(58) Field of Classification Search .................. 709/206
See application file for complete search history.

(56) References Cited

U.S. PATENT DOCUMENTS

| 5,703,934 | A | 12/1997 | Zicker et al. |
|---|---|---|---|
| 5,721,763 | A | 2/1998 | Joseph et al. |
| 5,960,069 | A | 9/1999 | Felger |
| 5,978,467 | A | 11/1999 | Walker et al. |
| 6,067,355 | A | 5/2000 | Lim et al. |
| 6,125,178 | A | 9/2000 | Walker et al. |
| 6,148,067 | A | 11/2000 | Leipow |
| 6,278,704 | B1 | 8/2001 | Creamer et al. |
| 6,782,081 | B2 | 8/2004 | Malik |
| 7,120,236 | B1 | 10/2006 | Schneider |
| 7,385,992 | B1 * | 6/2008 | Koch et al. ............... 370/401 |
| 2002/0154646 | A1 | 10/2002 | Dubois et al. |
| 2003/0021290 | A1 | 1/2003 | Jones |
| 2003/0028621 | A1 * | 2/2003 | Furlong et al. ............... 709/219 |
| 2003/0078987 | A1 | 4/2003 | Serebrennikov |
| 2003/0105822 | A1 | 6/2003 | Gusler et al. |
| 2003/0219104 | A1 | 11/2003 | Malik |
| 2004/0049545 | A1 | 3/2004 | Wayne Lockridge et al. |
| 2004/0057415 | A1 | 3/2004 | Colson et al. |

FOREIGN PATENT DOCUMENTS

| EP | 0750413 | 12/1996 |
|---|---|---|
| JP | 2001-175390 | 6/2001 |

* cited by examiner

*Primary Examiner*—Paul H Kang
(74) *Attorney, Agent, or Firm*—Novak Druce + Quigg LLP

(57) ABSTRACT

A method for providing caller identification information to instant messaging communication participants can include identifying an online presence for at least a first instant messaging client and determining caller identification information for a user associated with the first instant messaging client. The caller identification information can be provided to a second instant messaging client.

5 Claims, 2 Drawing Sheets

INSTANT MESSAGING WITH CALLER IDENTIFICATION

CROSS REFERENCE TO RELATED APPLICATIONS

This application is a continuation of, and accordingly claims the benefit from, U.S. patent application Ser. No. 10/237,650, now issued U.S. Pat. No. 7,376,703, which was filed in the U.S. Patent and Trademark Office on Sep. 9, 2002.

BACKGROUND OF THE INVENTION

1. Technical Field

The present invention relates to the field of multi-user communications and messaging, and more particularly, to the integration of telephony services and instant messaging.

2. Description of Related Art

Instant messaging allows users to communicate over a communications network in substantially real time. That is, instant messaging is a service which enables users to send relatively immediate messages to one another over a communications network using communications devices such as wireless telephones, pagers, computers, and personal digital assistants (PDAs). Typically, the instant messaging service is hosted by a server running an instant messaging application which facilitates communications between devices equipped with specialized messaging software referred to as an instant messaging client. For example, an instant messaging client can operate as a standalone application or can operate within a browser.

Instant messaging technology has progressed from single line text-based interfaces to more sophisticated graphical user interface (GUI) based instant messaging clients. These GUI-based instant messaging clients can process still images, real-time images, audio data, text data, and information about a particular user. The user information can be stored within an access device or on a server within a user profile. The information contained in the user profile can include personal information such as a name, age, address, and/or place of birth. General information about a user also can be stored in the user profile. For example, the user profile can specify the user's special interests such as hobbies, sports, and other leisure activities.

During an instant messaging session, in addition to seeing the text typed by a participant or hearing the audio spoken by a participant, profile information corresponding to the participant also can be displayed. For example, within conventional instant messaging clients, communications from particular participants can be identified by a screen name, an alias, or a handle. An affirmative step, however, is required to obtain additional information regarding an instant messaging session participant. For example, the profile for an instant messaging session participant can be presented responsive to a request from another participant. As this profile can be configured by the user, the profile may be incomplete or may not reflect accurate information. In consequence, the personal profile may provide little information to the requesting participant relating to the subject participants' identity. Accordingly, although instant messaging provides a medium for multi-user communication, conventional instant messaging systems provide little in the way of instant messaging session participant information.

SUMMARY OF THE INVENTION

The invention provides a solution for incorporating caller identification information obtainable from a telephony network with instant messaging in a communications network. Caller identification information corresponding to one or more instant messaging session participants can be determined through queries directed to the public switched telephone network. The retrieved caller identification information can be provided to one or more instant messaging clients participating in a given instant messaging session.

One aspect of the present invention can include a method for providing caller identification information to instant messaging communication participants. The method can include identifying an online presence for at least a first instant messaging client and determining caller identification information for a user associated with the first instant messaging client. For example, the caller identification information can be determined by querying a telephony data store for the caller identification information, and receiving the caller identification information from the telephony data store.

Accordingly, an online presence for at least a second instant messaging client can be identified. The caller identification information can be provided to the second instant messaging client. For example, the caller identification information can be provided responsive to a request from the first instant messaging client such as an instant message to the second instant messaging client or a request to initiate communications with the second instant messaging client. Alternatively, an instant message can be received from the first instant messaging client. The instant message can be modified to specify the caller identification information. An online presence for a second instant messaging client can be determined thereby allowing the caller identification information to be provided to the second instant messaging client responsive to a request from the first instant messaging client, for example within the modified instant message.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention provides a solution for incorporating caller identification information obtainable from a telephony network with instant messaging. In particular, during an instant messaging session, caller identification information corresponding to one or more instant messaging participants can be obtained from the telephony network. The caller identification information can be used to announce instant messaging participants to other participants of an instant messaging session. Additionally, the caller identification information can be included within instant messages distributed among the instant messaging participants.

Figure 1:
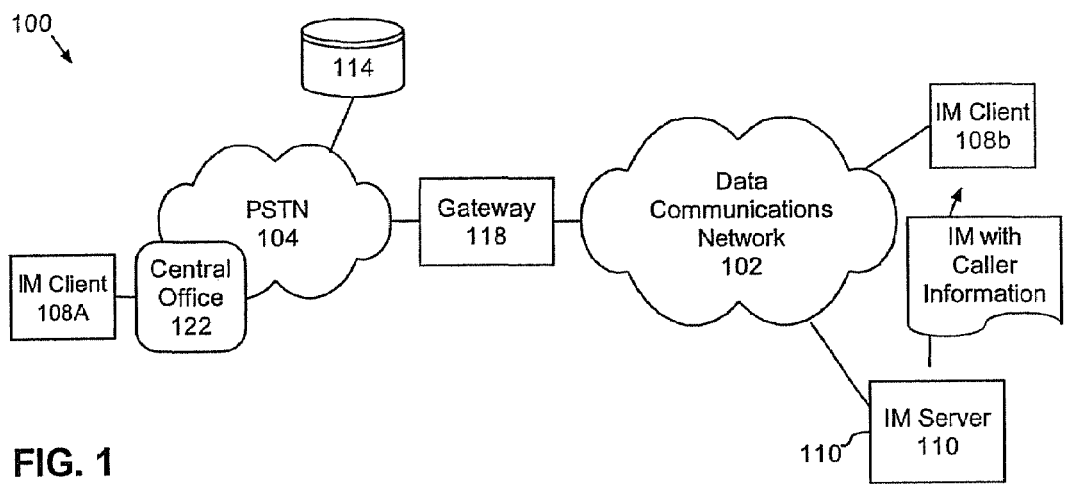
FIG. 1 is a schematic diagram illustrating a system for providing caller identification information to participants of an instant messaging session in accordance with the inventive arrangements disclosed herein.

FIG. 1 is a diagram of an exemplary system 100 for providing caller identification information to participants of an instant messaging session in accordance with the inventive arrangements disclosed herein. As shown in FIG. 1, the system 100 can include a data communications network 102 and a public switched telephone network (PSTN) 104. The PSTN 104 can include a central office 122 having a Signaling System 7 (SS7) and Advanced Intelligent Network (AIN) enabled telephony switching system. Thus, as is known in the art, the PSTN 104 can include signal switching points (SSP), signal transfer points (STP) for routing SS7 data, and signal control points (SCP) which can serve as front ends to databases such as data store 114.

The telephony switching system and/or the data store 114 can store subscriber information such as directory numbers, addresses, and name information for subscribers connected to the PSTN 104. Through the PSTN 104, queries can be directed to the telephony switching system via SS7/AIN to determine subscriber information. Additionally, queries can be directed to the data store 114 via SS7/AIN, for example through an SCP, to determine subscriber information which may not be stored locally within the telephony switching system. Accordingly, caller identification information, for example information typically associated with the "Caller ID" telephony service, can be obtained from the PSTN 104 by querying any of a local telephony switching system or external database such as data store 114.

The data communications network 102, for example the Internet, a wide area network (WAN), a local area network (LAN) or other suitable data communications network, can be communicatively linked to the PSTN 104 via a gateway 118. The data communications network 102 also can include cable data networks, wireless communications networks, or any other network and associated gateway/access point through which instant messaging service can be provided to users. As mentioned, the gateway 118 can serve as an interface between the PSTN 104 and the data communications network 102. The gateway 118 can include an SS7/IP interface allowing queries originating from the data communications network to be passed through to the PSTN 104 via the SS7 network and further enabling data received from the PSTN 104 to be passed to the data communications network 102. Notably, although the gateway 118 is depicted as being located between the PSTN 104 and the data communications network 102, those skilled in the art will recognize that the gateway 118 can be included as part of the PSTN 104 and/or the data communications network 102.

The instant messaging server 110 can include a registry specifying which users have logged onto the server and thus are available to participate in an instant messaging session. The instant messaging server 110 can function as a central repository for receiving instant messages from instant messaging clients and forwarding those messages to other instant messaging clients. The instant messaging server 110 can be configured to query the PSTN 104 via the gateway 118 to determine caller identification information corresponding to the instant messaging participants, for example, those users who have logged onto the instant messaging server 110.

According to one embodiment of the present invention, the instant messaging server 110 can be configured to send and receive SS7/AIN messages to the gateway 118. Notably, the instant messaging server 110 can include an SS7/AIN interface enabling the instant messaging server 110 to communicate directly with the PSTN 104. Alternatively, the instant messaging server 110 can send messages to the gateway 118 which can format appropriate SS7/AIN queries based upon the requests of the instant messaging server 110. Similarly, information received by the gateway 118 from the PSTN 104 can be converted for use by the instant messaging server 110 and then forwarded to the instant messaging server 110.

In operation, an instant messaging client 108a can log onto the data communications network 102 via the central office 122 and the PSTN 104. The instant messaging client 108a can execute within an appropriate communications device such as a personal computer, an instant messaging-enabled telephone, or any other communication device capable of establishing a communications link with the central office 122. For example, the instant messaging client 108a can connect to the central office 122 via a dial-up connection or a DSL connection.

Likewise, an instant messaging client 108b can establish a communications link with the data communications network 102. For example, the instant messaging client 108b can be included within a wireless phone configured for communications using short message service, a personal digital assistant, or other communications device capable of connecting to the data communications network 102 via a suitable gateway. Thus, although not depicted, it should be appreciated that the instant messaging clients 108a and 108b can be included within communications devices which can connect to the data communications network 102 via cable networks, digital subscriber line connections, wireless networks, and the like.

Once the instant messaging clients 108a and 108b are connected to the data communications network, the instant messaging clients can log onto the instant messaging server 110. Accordingly, the instant messaging server 110 can maintain a listing specifying that the instant messaging clients 108a and 108b are available for instant messaging communications. Instant messaging client 108a can initiate an instant message to instant messaging client 108b. The instant message can be forwarded to the instant messaging server 110 which can examine the message and determine the originating party. As the instant messaging server 110 can include identifying information for a user associated with the instant messaging client 108a, the instant messaging server 110 can match the incoming instant message to a particular user profile. Accordingly, the instant messaging server 110 can formulate a query to the PSTN 104 requesting caller identification information for the user associated with the instant messaging client 108a. For example, the instant messaging server 110 can include a limited set of user information, such as a directory number or an email address that can be correlated with caller identification information using an SS7 query directed to the PSTN 104.

After receiving caller identification information specified within a response from the PSTN 104, the instant messaging server 110 can interpret the information and include that information within the received instant message from instant messaging client 108a. The instant message can be provided to the instant messaging client 108b. Thus, when the instant message is presented by the instant messaging client 108b, the message can provide identifying information corresponding to the user associated with the instant messaging client 108a. For example, the caller identification information can be displayed or played audibly. Notably, the instant messaging server 110 can obtain caller identification information for particular instant messaging clients as users log onto the instant messaging server 110 rather than when an instant message is received from an instant messaging session participant.

Although the illustration disclosed herein indicates that instant messaging client 108a initiates communications, it should be appreciated that either instant messaging client 108a or 108b can initiate communications. Moreover, each of the instant messaging clients 108a and 108b can be connected to the data communications network 102 via the central office 122 or another access point/gateway interface into the data communications network 102.

According to an alternative embodiment of the present invention, the instant messaging server 110 can include additional user information such as a name, address, directory number, or other additional personal information. The information can be stored within the instant messaging server 110 and associated with the user as well as an Internet protocol (IP) address associated with that user for the given instant messaging session. Thus, when instant messages are received from an instant messaging client such as instant messaging client 108a, the instant messaging server 110 can include identifying information such as a user's proper name, an address, a directory number, and any other personal information previously specified by the user.

Figure 2:
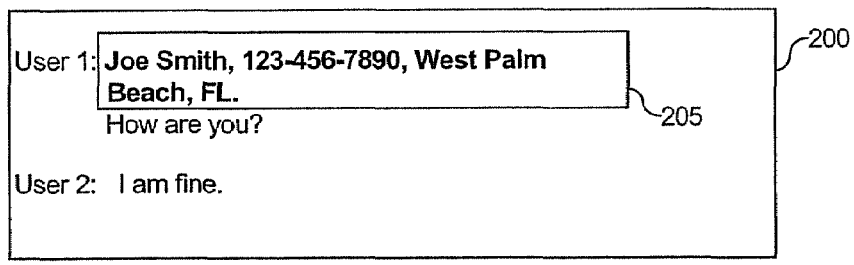
FIG. 2 is a schematic diagram illustrating an exemplary display of an instant messaging client in accordance with the inventive arrangements disclosed herein.

FIG. 2 is a schematic diagram illustrating an exemplary display 200 of an instant messaging client in accordance with the inventive arrangements disclosed herein. The display 200 depicts an exemplary instant messaging session between two participants: user 1 and user 2. User 1 has initiated an instant messaging session with user 2. Accordingly, the instant message from user 1 has been received by the chat client of user 2. The caller identification information 205 can be interpreted and displayed as shown. The caller identification information 205 can include personal information such as the name of user 1 (Joe Smith), a directory number associated with user 1, and a city associated with user 1. As mentioned, the caller identification information 205 also can be audibly presented.

When user 2 responds to user 1, the instant message initiated from user 2 can be modified to include identifying information such as caller identification information corresponding to user 2. Thus, the instant messaging client of user 1 can display the identifying information of user 2. The identifying information can be included within a first instant message from each user after joining an instant messaging session, within each message, or any combination thereof.

Figure 3:
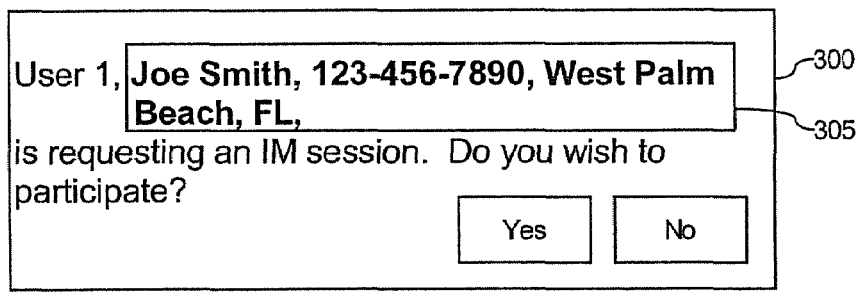
FIG. 3 is a schematic diagram illustrating another exemplary display of an instant messaging client in accordance with the inventive arrangements disclosed herein.

FIG. 3 is a schematic diagram illustrating another exemplary display 300 of an instant messaging client in accordance with the inventive arrangements disclosed herein. Display 300 illustrates a pop-up style user interface which can be used to notify a user that another user wishes to begin an instant messaging session and/or add the receiving user to an instant messaging address book to monitor when the user is online. As shown, the text within the display 300 can include identifying information 305 such as caller ID information identifying the requesting party.

Figure 4:
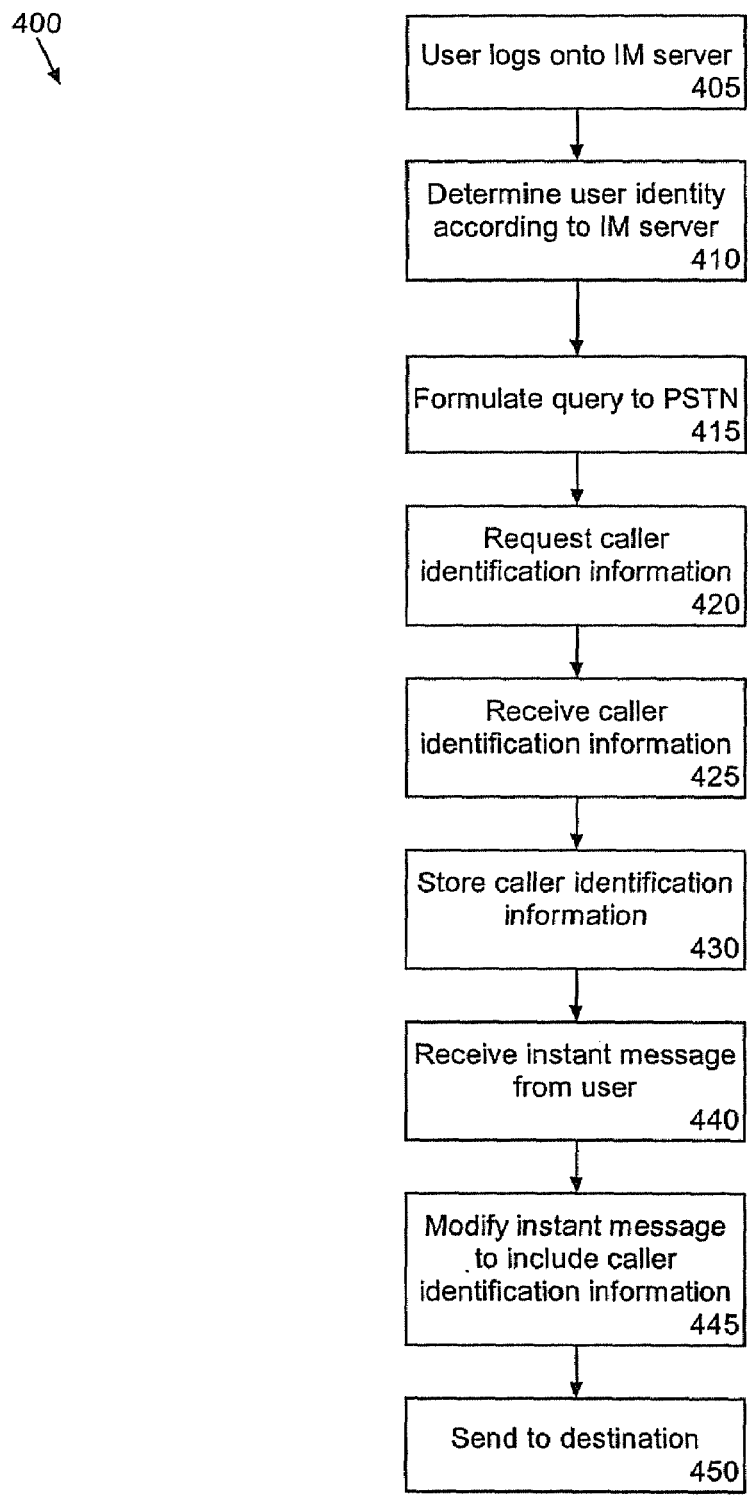
FIG. 4 is a flow chart illustrating a method of incorporating caller identification information into an instant messaging session in accordance with the system of FIG. 1.

FIG. 4 is a flow chart illustrating a method 400 of incorporating caller identification information into an instant messaging session in accordance with the system of FIG. 1. One embodiment of the present invention where the instant messaging server determines caller identification information responsive to receiving an instant message has been described with reference to FIG. 1. Accordingly, FIG. 4 illustrates an embodiment of the present invention where caller identification information is determined when a user logs in to the instant messaging server. The method 400 can begin in a state wherein one or more users have established a presence online, whether via a dial-up connection, a wireless connection, and/or another high speed connection. In step 405, the user can log onto the instant messaging server. For example, through an instant messaging client, the user can provide a user name and/or password. Logging onto the instant messaging server indicates that the user (instant messaging client) is online and is capable of sending and receiving instant messages.

In step 410, the instant messaging server can identify the user. The instant messaging server can access a set of user profiles and identify the profile corresponding to the user logging onto the instant messaging server, for example using the user name and password. The profiles can specify any of a variety of personal information associated with the user. For example, the personal profiles can specify a directory number, a full name for the user, an address, and the like. Regardless, the profile can specify a unique identifier which can be provided to the PSTN when querying for caller identification information.

In step 415, the instant messaging server can formulate a query to be sent to the PSTN asking for caller identification information corresponding to the user that has logged on to the instant messaging server. The instant messaging server can generate an appropriate SS7/AIN query. Although the PSTN can be programmed to utilize any of a variety of unique identifiers when attempting to query the PSTN, according to one embodiment, the instant messaging server can include the user's directory number as determined from the user profile. The instant messaging server can query the PSTN for caller identification information for each user logged onto the instant messaging server. In step 420, the instant messaging server can send the request for caller identification information. As mentioned, the instant messaging server can include an SS7/AIN interface or can forward the request to the gateway interface to the PSTN.

In step 425, the caller identification information can be received from the PSTN. As mentioned, the caller identification information can be obtained from an SS7/AIN-enabled telephony switching system and/or a telephony data store. Regardless, in step 430, the instant messaging server can store the caller identification information, for example, within the user profile for use at a later time. In step 440, after the user has logged on to the instant messaging server, the instant messaging server can receive an instant message from the user. The instant messaging server then can consult the user profile and retrieve the caller identification information corresponding to the user.

In step 445, the caller identification information can be included within the received instant message. For example, the caller identification information can be included within a header portion of the instant message such that the receiving instant messaging client can parse the relevant caller identification information from the received instant message and display the caller identification information to the user via the instant messaging client display window.

According to another aspect of the present invention, responsive to receiving an instant message from an instant messaging client, the instant messaging server can send an instant message to the intended recipient. In that case, the instant messaging server can generate the instant message asking the intended recipient whether the intended recipient wishes to engage in an instant messaging session with the sending user. The generated instant message can include the caller identification corresponding to the requesting user as determined from the PSTN.

Still, caller identification information can be provided to users upon logging on to the instant messaging server to indicate which other users, for example as specified within a "buddy list", also are logged on to the instant messaging server. Notably, such an embodiment would not require an initiating request from a user. In any case, whether the instant messaging server generates the instant message or modifies a received message, the instant message specifying the caller identification information for the initiating user (or other users logged on to the instant messaging server) can be sent to the intended recipient user.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A machine-readable storage, having stored thereon a computer program having a plurality of code sections executable by a machine for causing the machine to perform the steps of:

detecting a presence of at least one instant messaging client newly connected to an instant messaging environment;

determining a user identity associated with said newly connected instant messaging client;

querying a telephony network data store for caller identification information associated with said user identity;

receiving said caller identification information from said telephony network data store; and adding said caller identification information to a caller identification data store, said caller identification data store comprising caller identification information associated with one or more instant messaging clients currently connected to said environment.

2. The machine-readable storage of claim 1, further comprising:

providing said caller identification information stored in said caller identification data store to at least one of said connected instant messaging clients.

3. The machine-readable storage of claim 2, wherein said providing step is responsive to a request from said one of said connected instant messaging clients.

4. The machine-readable storage of claim 1, further comprising:

receiving an instant message from at least one of said connected instant messaging clients;

accessing said caller identification data store to retrieve said caller identification associated with said one of said connected instant messaging clients; and modifying said received instant message to include said retrieved caller identification information.

5. The machine-readable storage of claim 4, further comprising:

identifying an online presence for at least one other of said connected instant messaging clients to which said instant message is directed; and providing said modified instant message to said one other of said connected instant messaging clients.

* * * * *